United States Patent [19]

Morse et al.

[11] Patent Number: 5,291,603
[45] Date of Patent: Mar. 1, 1994

[54] MICROPROCESSOR SYSTEM WITH MULTIPLE INTERRUPTS MASKED FOR USE IN ELECTRONIC CONTROL OR MONITORING OF VARIOUS SOLID-STATE PRODUCTS

[75] Inventors: Charles A. Morse, Asheville; Edward C. Prather, Hendersonville, both of N.C.

[73] Assignee: Westinghouse Electric Corp., Pittsburgh, Pa.

[21] Appl. No.: 669,557

[22] Filed: Mar. 14, 1991

[51] Int. Cl.⁵ .............................................. G06F 9/46
[52] U.S. Cl. .................................. 395/725; 364/280.8;
364/263.2; 364/241.2; 364/244.6; 364/262.4;
364/262.9; 364/DIG. 1
[58] Field of Search .................. 364/DIG. 1 MS File,
364/DIG. 2 MS File, 140; 395/725, 275, 650,
700, 325, 775

[56] References Cited

U.S. PATENT DOCUMENTS

| | | | |
|---|---|---|---|
| 3,675,214 | 7/1972 | Ellis et al. | 364/200 |
| 3,800,287 | 3/1974 | Albright | 364/200 |
| 3,875,564 | 4/1975 | Thuruoka et al. | 364/200 |
| 4,152,761 | 5/1979 | Louie | 364/200 |
| 4,217,638 | 8/1980 | Namimoto et al. | 364/200 |
| 4,218,739 | 8/1980 | Negi et al. | 364/200 |
| 4,247,894 | 1/1981 | Beismann et al. | 364/200 |
| 4,355,360 | 10/1982 | Asano et al. | 364/431.11 |
| 4,523,277 | 6/1985 | Schnathorst | 364/200 |
| 4,628,449 | 12/1986 | Zardiackas | 364/200 |
| 4,638,452 | 1/1987 | Schultz et al. | 364/900 |
| 4,683,549 | 7/1987 | Takaki | 364/200 |
| 4,779,187 | 10/1988 | Letwin | 364/200 |
| 4,839,795 | 6/1989 | Iwaksaki | 364/200 |
| 4,969,090 | 11/1990 | Monson et al. | 364/200 |
| 5,027,273 | 6/1991 | Letwin | 364/200 |

Primary Examiner—Gopal C. Ray
Attorney, Agent, or Firm—M. J. Moran

[57] ABSTRACT

A microprocessor used in solid state products has multiple interrupts and a single read only memory (ROM) masked for two or more product programs. The logic state of an input pin is set to select the appropriate program. If there is an error in one program or it becomes obsolete, the microprocessor does not have to be scrapped, but can be used to execute the other (another) product program. Separate interrupt selection routines for each interrupt, addressed from a common interrupt vector table, direct program execution to an interrupt branch table for the product indicated by the input pin. The product branch table contains addresses for the interrupt service routines for the selected product. The product programs are first separately linked with the interrupt branch table for the corresponding product. The common interrupt vector table and the interrupt selection routines are then linked with one product program and its interrupt branch table, before final linkage of all software components to avoid conflicts should a program be changed.

9 Claims, 4 Drawing Sheets

| ROM MAP | |
|---|---|
| ADDRESS | CONTENTS |
| 6000H (BASE ADDRESS) | PRODUCT A PROGRAM CODE — 40 |
| 7060H | PRODUCT SELECTION ROUTINES — 41 |
| 7087H | PRODUCT B PROGRAM CODE — 42 |
| ⋮ | ⋮ — 45 |
| 7F84H | PRODUCT B INTERRUPT BRANCH TABLE |
| 7FA2H | PRODUCT A INTERRUPT BRANCH TABLE — 43 |
| 7FC0H | INTERRUPT VECTOR ADDRESSES — 39 |

| RAM MAP | | |
|---|---|---|
| ADDRESS | PAGE | CONTENTS |
| 0000H | 0 | PRODUCT A RAM |
| 0000H | 1 | PRODUCT B RAM |
| ⋮ | ⋮ | ⋮ |

FIG. 4

MICROPROCESSOR SYSTEM WITH MULTIPLE INTERRUPTS MASKED FOR USE IN ELECTRONIC CONTROL OR MONITORING OF VARIOUS SOLID-STATE PRODUCTS

BACKGROUND OF THE INVENTION

1. Field of the Invention

This invention is directed to a microprocessor having a single read only memory (ROM) which is masked to handle interrupts for two or more separate application programs so that the microprocessor may be used interchangably in different solid-state products.

2. Background Information

The development of microprocessors implemented by an integrated circuit, the "computer on a chip", has contributed greatly to the expansion of functions that can be performed by many products. Not only has the variety of functions of such products been expanded by these microprocessors, but the specific functions, or combinations of functions, can be tailored to the application. This versatility is realized through programming of the microprocessor. The program is stored in a nonvolatile memory. For large volume products, a read only memory (ROM) in which the program is permanently etched into the integrated circuit is used to store the program. A microprocessor which is programmed in this manner is referred to as a "masked microprocessor" in reference to the processing techniques by which the appropriate circuit configuration is established. While programmable memories can be used for storing programs which are likely to be modified, either from application to application or for enhancements, the ROMs of the masked microprocessor are much less costly when implemented in large numbers. On the other hand, the use of masked microprocessors in solid state products has always presented the risk that if programming bugs exist, or a change in the program is required, all instock processors have to be scrapped.

The microprocessor conventionally has available several interrupts which allow the program to leave a routine to perform a task with a higher priority and then to resume the original routine. These interrupts can be in response to internal signals such as from a timer, a counter, a reset module or an input/output device, or from external signals such as a signal from the operation of contacts or from a sensor. Typically, these interrupts are implemented by an interrupt vector table in memory which stores an address for branching to an appropriate interrupt service routine. The service routines are the sets of instructions to be carried out by the processor in response to the interrupts.

There remains a need for a mass produced multiple interrupt microprocessor with an inexpensive masked memory which does not have to be scrapped if there is an error in the program etched into the masked memory or if the program is later changed.

SUMMARY OF THE INVENTION

This need and others are satisfied by the invention which is directed to a microprocessor with multiple interrupts and having a single masked read only memory. In accordance with the invention, the read only memory (ROM) is masked to store two or more separate programs which may be selectively implemented by the microprocessor. These separate programs could be redundant copies of the same program, but preferably are different programs which give the microprocessor the capability of performing different functions. Thus, where the microprocessor is used to provide electronic control for various products, it can be programmed to be interchangeably used in two or more different products, or to provide different kinds of control for a given product. If it turns out that one of the programs is defective or has become obsolete, the microprocessor need not be discarded, but can be used with another product for which the memory has been masked. Obviously, if all programs for which the ROM is masked are defective and/or become obsolete, then the microprocessor chip must be discarded; however, even where the ROM is masked for only two alternate programs, the likelihood of such events affecting both programs occurring simultaneously is significantly less than the likelihood of just one such event occurring.

In carrying out the invention with a microprocessor having multiple interrupts, the ROM is masked to provide a separate interrupt selection routine for each interrupt. A common interrupt vector table in ROM directs the processor to the selection routine for the current interrupt. The product program to be executed is set by a logic level applied to a microprocessor input. The selection routines poll this input and transfer program execution to an interrupt branch table for the selected product program. The branch table contains the addresses of all of the separate interrupt service routines for the selected product program. Program execution branches to the interrupt service routine for the current interrupt found in the branch table. Each product program is separately linked with its own interrupt branch table. The common interrupt branch table and all of the interrupt selection routines are also linked with one product program before all of the software is linked for masking the ROM to permit the use of common labels in the different product programs without conflict.

BRIEF DESCRIPTION OF THE DRAWINGS

A full understanding of the invention can be gained from the following description of the preferred embodiments when read in conjunction with the accompanying drawings in which:

FIG. 3 is an illustration of a map of the read only memory of the system of FIG. 1.

FIG. 4 is an illustration of a map of the random access memory of the system of FIG. 1.

DESCRIPTION OF THE PREFERRED EMBODIMENTS

Figure 1:
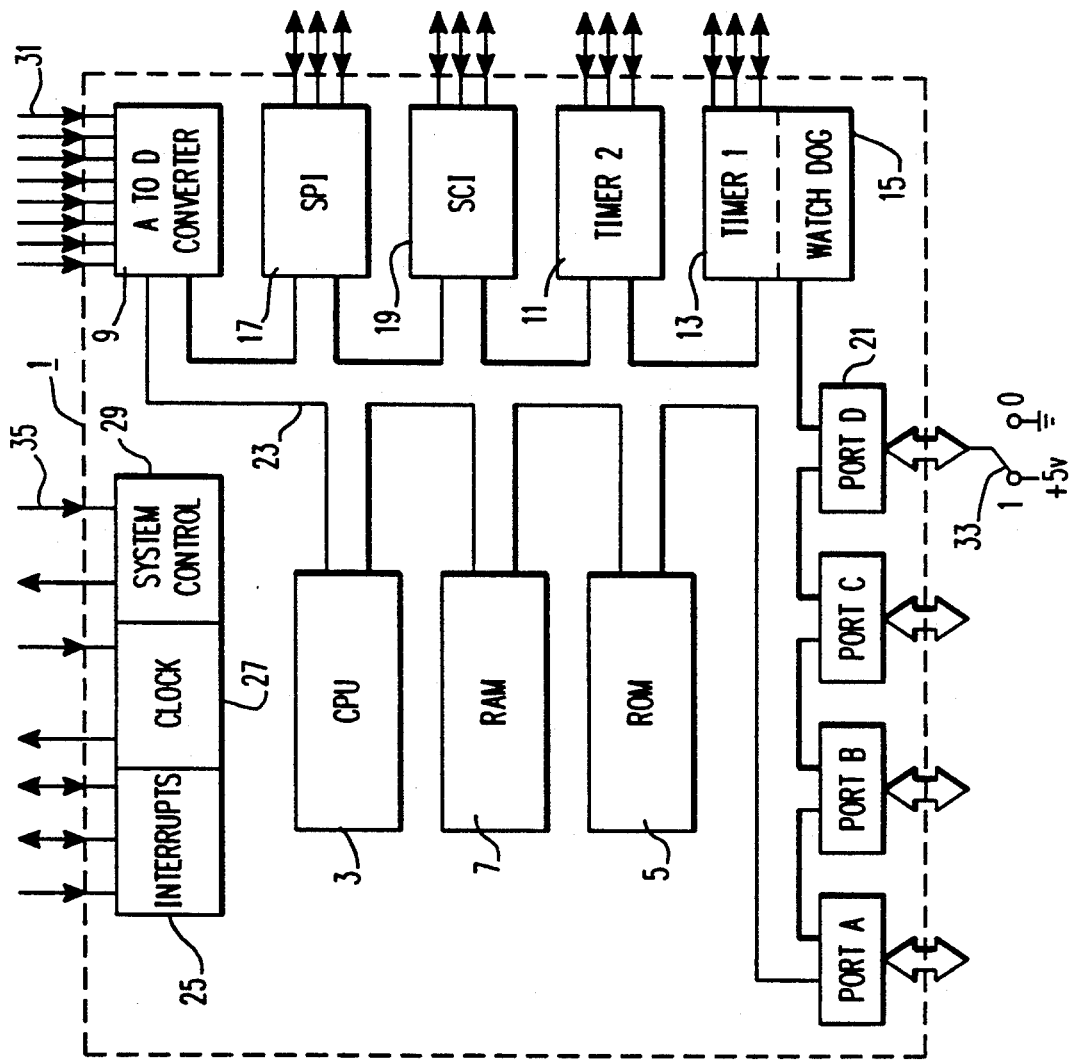
FIG. 1 is a schematic diagram of a microprocessor system in accordance with the invention.

Referring to FIG. 1, a typical microprocessor 1 incorporating the invention is shown schematically. The microprocessor 1 includes a central processing unit (CPU) 3, a read only memory (ROM) 5, a random access memory (RAM) 7, an analog to digital converter (ADC) 9, several timers 11, 13, and 15 and several input to output devices such as a serial peripheral interface (SPI) 17 and a serial communications interface (SCI) 19. In addition, the microprocessor 1 includes several input/output ports 21, such as ports A-D. These components of the microprocessor 1 are interconnected by a bus system 23. The microprocessor 1 further includes external interrupts 25, an oscillator clock 27 and a system control 29.

An example of a suitable microprocessor 1 is a TMS370 microcomputer manufactured by Texas Instruments, Inc. The CPU 3 of the exemplary microprocessor 1 is an 8-bit processor with an internal status register, program counter register, and a stack pointer. The CPU 3 uses the RAM 7 as working registers accessed on the bus 23. The ROM 5 stores the multiple application programs for the products with which the microprocessor 1 is to be alternatively used. As will be seen, the ROM 5 also stores the files used to handle interrupts for the multiple independent application programs. The ADC 9 multiplexes analog signals on multiple input channel 31 and converts them to digital signals for internal use by the CPU 3. The SPI 17 is a high-speed synchronous serial input/output port which provides for communications between the microprocessor 1 and external peripherals or another microprocessor. The serial communications interface (SCI) 19 provides for digital communications between the microprocessor 1 and other asynchronous peripherals. The timers 11 and 13 provide the capability of timing for real time control and counting. The watch dog timer 15 can be used to perform a dead man function or can be used as an additional timer/counter. The ports A-D, 21, can be used for either digital input or output. In accordance with the invention, these ports can be used for selection of the application program to be run by the microprocessor 1. While as explained above, the invention contemplates programming the micro-controller 1 to perform any one of a number of alternative application programs, the invention will be described as providing the capability to select one of two independent application programs. As indicated in FIG. 1, this capability is provided by a switch 33 which inputs either a logical 1 or 0 for selection of the appropriate application program.

The clock module 27 is connected to an external crystal oscillator (not shown) to provide the timing function for the microprocessor 1. The system control module 29 includes a reset line 35 by which the microcontrol is initialized. The interrupt module 25 allows the microprocessor 1 to respond to external interrupts. Internal interrupts are generated by the system control 29, the A to D converter 9, the serial peripheral interface 17, the serial communications interface 19 and the timers 11, 13, and 15. The number of interrupts vary with the particular microprocessor used; however, in the exemplary microprocessor, there are ten interrupts available.

Figure 2:
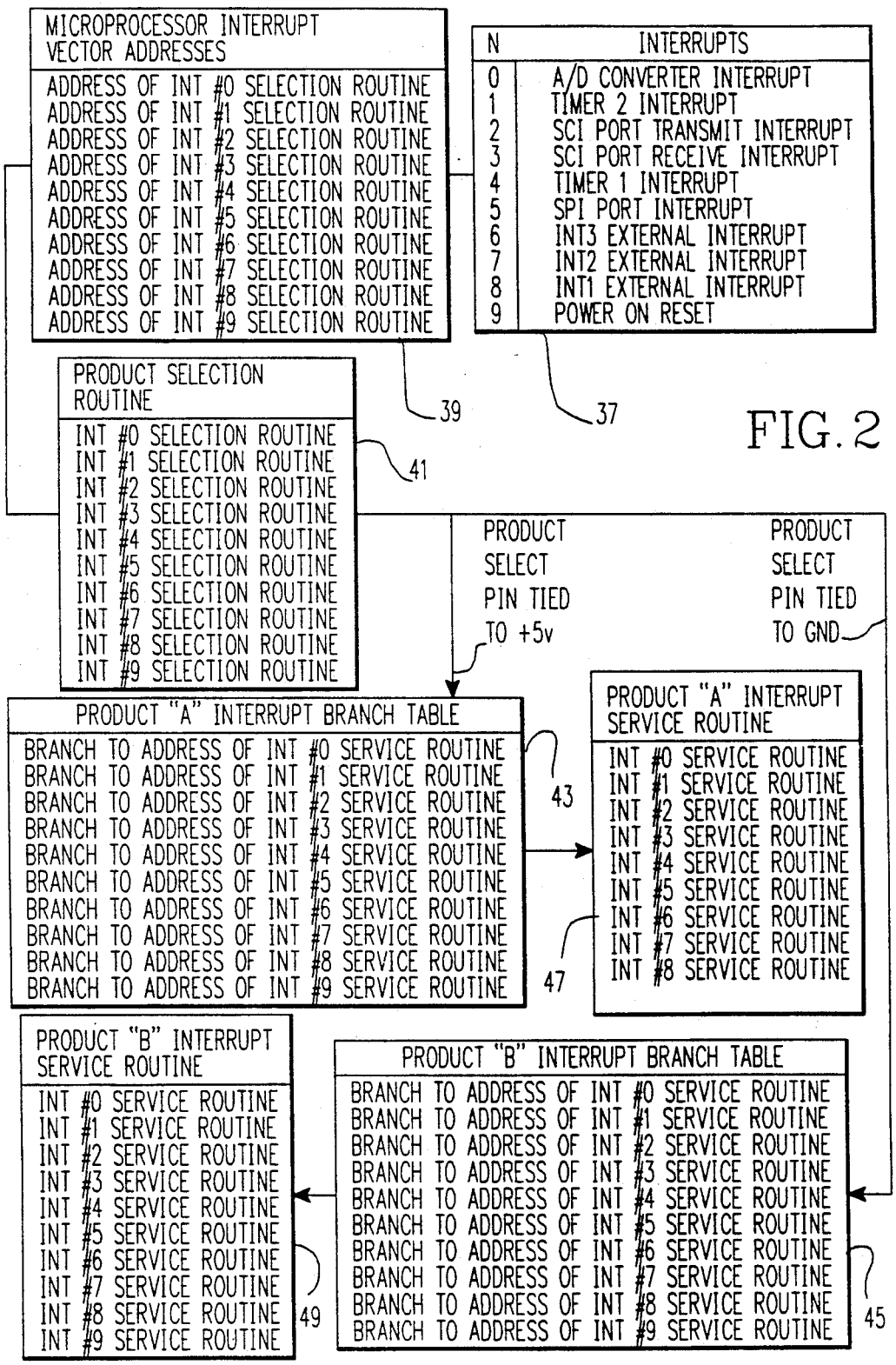
FIG. 2 is an illustration of the manner in which the microprocessor system of FIG. 1 handles multiple interrupts for two product programs.

In accordance with the invention, the microprocessor 1 is adapted to alternatively execute multiple (in the exemplary embodiment 2) independent application programs which share masked ROM 5, the entire RAM 7 and common interrupt vectors. Since the microprocessor 1 is being described for use in controlling various products, the application programs will hereafter be referred to as product programs, meaning application programs written for a specific product. In he exemplary system, the microprocessor 1 is used alternatively for controlling an electric meter and a resistance temperature detector. Obviously, the programs adapted for these two products will utilize the various interrupts for different functions. Since common interrupt vectors are used; however, a procedure must be provided for directing the microprocessor to the appropriate service routine for the current product program being executed. The process by which this is achieved in accordance with the invention is illustrated in FIG. 2. Block 37 in FIG. 2 identifies the ten interrupts, labeled 0 to 9, which are available in the exemplary microprocessor. A separate interrupt selection routine is provided for each interrupt. The common interrupt vectors comprise a table 39 which stores the address of the selection routine 41 for each of the interrupts 0 to 9. Upon the occurrence of an interrupt, the CPU accesses the interrupt vector table 39 to find the address of the selection routine 41 for the current interrupt. The appropriate selection routine 41 is then run. These interrupt selection routines are short programs which check the product selection pin at port D to determine the position of the product selection switch 33. If the switch 33 is set to the logic 1 value (+5 V), the processor branches to the entry for the current interrupt in a product A branch table 43. If the selection switch 33 is set to logic 0 (tied to ground), the selection routine 41 branches to the appropriate location in the product B interrupt branch table 45. The branch tables 43 and 45 contain the addresses for the separate product A interrupt service routines 47 and product B interrupt service routines 49, respectively, which are then executed by the processor. If a particular interrupt is not required in one product program, a return from interrupt instruction is used in the interrupt service routine of the interrupt for that product. Upon completion of the appropriate interrupt service routine, the processor returns to the program being executed at the time of the interrupt.

While the ROM 5 is masked to store the product programs and the above scheme for handling interrupts, it is still likely that changes may be desired in the software in future additions of the product. In order to prevent software changes from generating conflicting labels or addresses for the multiple programs, one of the product programs is first linked separately along with its branch table. The other product program is then linked separately with its branch table, the decision-making interrupt service routines and the interrupt vectors pointing to these routines. By linking the programs independently, labels are resolved within the separate modules so that if the same label is used in both products, the correct address is assigned before each reference. The partially linked files are then linked and located into a single executable file.

FIG. 3 illustrates a total map 38 of the ROM 5 in which the product programs and interrupt files have been linked in this manner. As can be seen from FIG. 3, the product A program code 40 begins at address 6000H. The product selection routines 41 are stored with the product A program code with which they were linked starting at address 7060H. This is followed by the product B program code 42 beginning at address 7087H. If additional product programs are to be made available to the microprocessor, they would be stored next. Following the last product program code, the product B interrupt branch table 45 is stored beginning at address 7F84H. This is followed by the product A interrupt branch table 43 beginning at address 7FA2H and finally the microprocessor interrupt vector address table 39 beginning at address 7FC0H. Of course, interrupt branch tables must also be provided for any additional product programs. The addresses of these new branch tables must be hard coded into the product selection routines. The number of products that can be served by the microprocessor is limited by the size of the ROM 5 and the length of the independent programs. Of course, the product programs can include independent programs for different models of the same product as well as programs for very different products. The ROM map 38 in FIG. 3 is exemplary only and may be differently organized within the scope of the invention.

As mentioned above, the interrupt branch tables 43 and 45 make it convenient for making program changes in future additions of the microprocessor 1. The branch tables can be eliminated; however, this requires hard coding the addresses of the interrupt service routines into the selection routines. This would then require added care in making program changes to avoid conflicts in use of the ROM.

In order to allow each of the product programs to have use of the full space in RAM 7 when executing, the linker must be able to accommodate memory page definitions. FIG. 4 illustrates a map for the RAM 5 in which memory for the two programs exist on overlying pages, each of which start with the first address 0000H.

Figure 5:
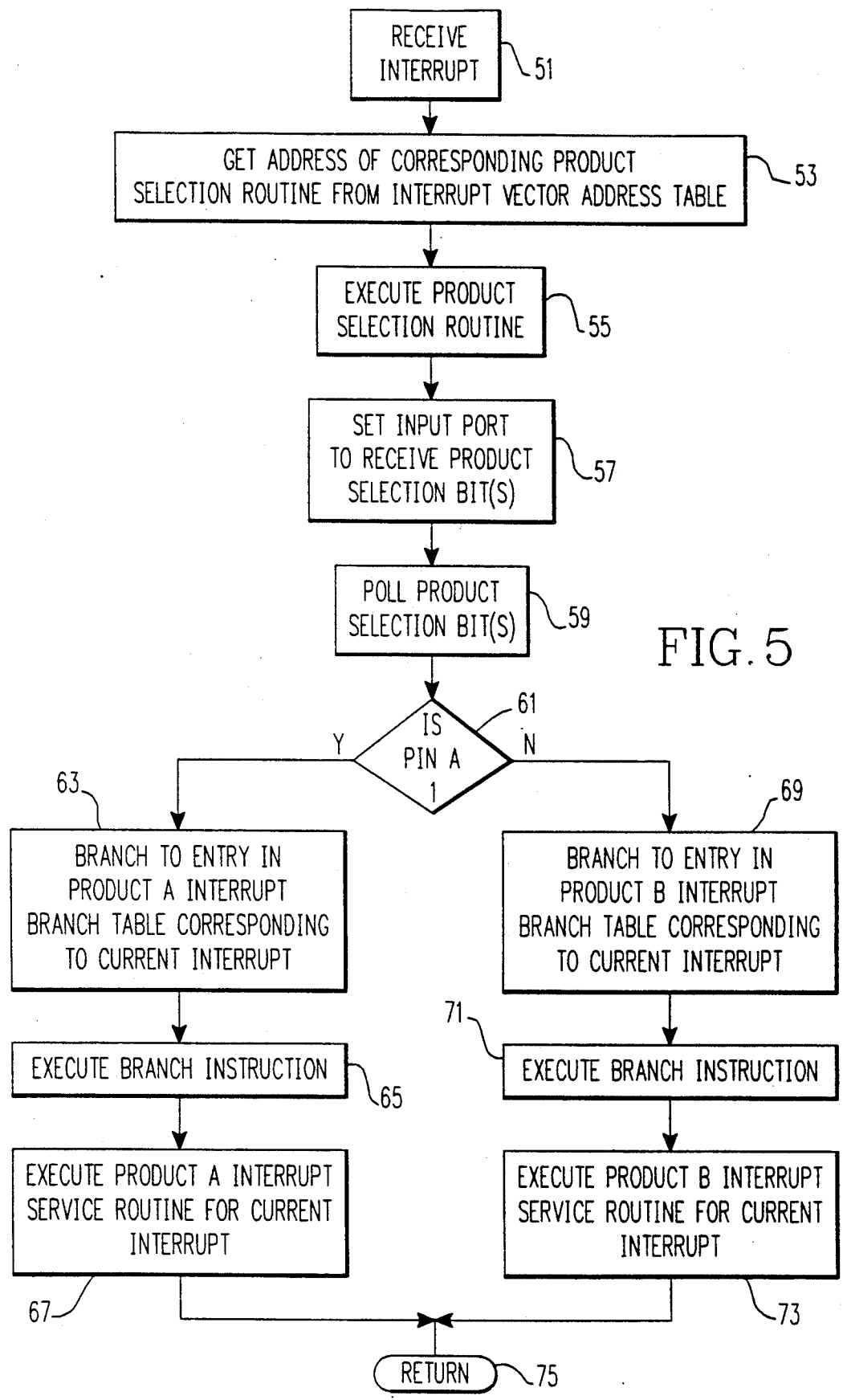
FIG. 5 is a flow chart showing operation of the system of FIG. 1 in accordance with the invention.

FIG. 5 illustrates a flow chart for the microprocessor 1 incorporating the invention. When the processor receives the interrupt at 51, it obtains the address of the corresponding interrupt selection routine from the interrupt vector address table as indicated at 53. The selection routine for the indicated interrupt is then executed at 55. This includes setting up the input port to receive the product selection bit(s) as indicated at 57. The product selection bit(s) is then polled at 59, and if the selection bit(s) is a logic 1 as determined at 61, program execution branches to the entry in the product A interrupt branch table corresponding to the current interrupt as indicated at 63. The branch instruction at the designated entry in the interrupt branch table for product A and the corresponding interrupt is then executed at 65 to jump to the interrupt service routine for the current interrupt as indicated at 65. The product A interrupt service routine for the current interrupt is then executed at 67.

If the product selection pin is a logic 0 at 61, then program execution branches to the entry in the product B interrupt branch table corresponding to the current interrupt as indicated at 69. The branch instruction in the product B interrupt branch table for the current interrupt is then executed at 71. This leads to execution of the product B interrupt service routine for the current interrupt at 73. At the conclusion of the appropriate interrupt service routine, the program returns, as indicated at 75, to the program which was being executed at the time of the interrupt. Upon initialization, a reset interrupt is generated. The reset interrupt service routine for the product program selected by the product selection switch 33, which is polled by the reset interrupt service routine, ends with a call for the selected product program. All other interrupt service routines for that product return program execution to that product program.

As seen from the above, the present invention permits a masked microprocessor to be stocked for two or more products. This reduces the per unit cost by increasing the volume of the masked microprocessor. It also provides insurance against an error in a product's software program, and allows for obsolescence of a product program.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A digital processor system for alternatively executing a selected one of a plurality of independent application programs, said system comprising:
   a microprocessor having means for accepting multiple interrupts;
   a single read only memory (ROM) masked to store said plurality of independent application programs and to store a common interrupt vector table accessed by said microprocessor in response to an active interrupt, an interrupt selection routine for each interrupt, and an interrupt service routine for each interrupt for each of said plurality of independent application programs; and
   program selection means for generating a selection signal designating a selected application program for execution by the microprocessor so that the selected one of the application programs is alternatively executed; said common interrupt vector table containing addresses of said interrupt selection routines, said interrupt selection routines responding to said program selection means and directing the microprocessor to an interrupt service routine for the active interrupt for the selected application program for execution by said microprocessor.

2. The system of claim 1 wherein said single ROM is further masked to provide a separate interrupt branch table associated with each application program, each interrupt branch table containing jump instructions for transferring execution of the interrupt by the microprocessor to an interrupt service routine for the active interrupt for the associated application program.

3. The system of claim 2 wherein said single ROM is masked to provide said interrupt branch tables which are each linked separately with the associated application program before the application programs are linked together.

4. The system of claim 3 wherein said single ROM is masked to provide said common interrupt vector table and said product selection routines linked with one of said application programs separately linked with the associated interrupt branch table.

5. The system of claim 4 including a random access memory (RAM) used by said microprocessor to store data during execution of the selected application program, said application programs being linked to provide a separate page of memory in said RAM for each application program.

6. A digital processor system for alternative use with one of two products controlled by first and second product programs respectively, said system comprising:
   a microprocessor accepting multiple interrupts;
   a single read only memory (ROM) masked to store said first and second product programs, an interrupt service routine for each of said interrupts for each of said products, a product interrupt branch table associated with each product each including branch instructions to each of said interrupt service routines for the associated product, a selection routine for each interrupt responsive to a product selection signal to select in the product interrupt branch table associated with a selected product indicated by the product selection signal a branch instruction for an active interrupt, and a common interrupt vector table accessed by the microprocessor in response to an active interrupt and containing addresses of the product selection routines, and;

product selection means for generating said product selection signal indicating the selected product so that the digital processor system is alternatively used with the selected one of the two products controlled by the first or second product program, respectively.

7. A method of masking a single ROM for use by a microprocessor accepting multiple interrupts in alternatively executing a selected one of a plurality of application programs said method comprising the steps of:

providing said plurality of application programs;

providing a separate interrupt service routine for each of said multiple interrupts for each of said plurality of application programs;

providing a program selection routine for each of said multiple interrupts including jump instructions transferring execution by the microprocessor in response to an interrupt to an interrupt service routine for a selected application program;

providing a common interrupt vector address table containing an address for each program selection routine to be accessed by said microprocessor in response to an active interrupt;

linking said common interrupt vector address table and said program selection routines together with one of said application programs;

linking all other application programs with the one application program linked with the common interrupt vector address table and said program selection routines; and masking said single ROM to store said linked application programs, common interrupt vector address table and program selection routines so that said microprocessor alternatively executes said selected one of said plurality of application programs.

8. The method of claim 7 including: providing a program interrupt branch table associated with each program containing an address for each interrupt service routine for the associated program, and wherein said program interrupt branch tables are linked separately with the associated application program before the application programs are linked together.

9. The method of claim 8 adapted for use with a microprocessor having a random access memory (RAM) and including linking said application programs together with each independent application program assigned a separate page providing full access to said random access memory.

* * * * *